United States Patent [19]

Lambert et al.

[11] 4,259,834

[45] Apr. 7, 1981

[54] SYNCHRONIZED FLAIL FOR TREATMENT OF FORESTRY RESIDUES

[75] Inventors: Michael B. Lambert, Annandale, Va.; Leonard B. Della-Moretta, Pomona, Calif.

[73] Assignee: The United States of America as represented by the Secretary of Agriculture, Washington, D.C.

[21] Appl. No.: 61,170

[22] Filed: Jul. 26, 1979

Related U.S. Application Data

[63] Continuation-in-part of Ser. No. 860,275, Dec. 13, 1977, abandoned.

[51] Int. Cl.$^3$ ............................................. A01D 50/00
[52] U.S. Cl. ........................................ 56/504; 37/91; 56/12.7; 56/294
[58] Field of Search ................ 56/294, 249, 504, 10.7, 56/12.7; 37/91-94, 189; 299/79, 89, 90

[56] References Cited

U.S. PATENT DOCUMENTS

| 2,938,326 | 5/1960 | Lundell | 56/12.7 |
| 3,574,989 | 4/1971 | Rousseau et al. | 56/10.7 |

FOREIGN PATENT DOCUMENTS

| 2427743 | 12/1975 | Fed. Rep. of Germany | 56/504 |
| 6515224 | 5/1967 | Netherlands | 56/294 |

Primary Examiner—Jay N. Eskovitz
Attorney, Agent, or Firm—M. Howard Silverstein; David G. McConnell

[57] ABSTRACT

In a machine for treatment of tree thinning residues and logging slash of the type having free-swinging flails pivotably connected to rotatable support structures at a pivot point, the improvement is made wherein each flail comprises a cutting blade containing the effective center of mass of said flail, and a plurality of side arms connected at one end of said cutting blade and having at the other end means for pivotal connection to said rotatable support structure, said means for pivotal connection being located on said rotatable support structure and the length of said arms being such that the distance R from the axis of rotation of said rotatable support structure to said pivot point, and the distance L from said pivot point to said flails effective center of mass having the following relationship:

$$\sqrt{R/L} = n/2$$

where n is any integer from 1 to 5.

1 Claim, 6 Drawing Figures

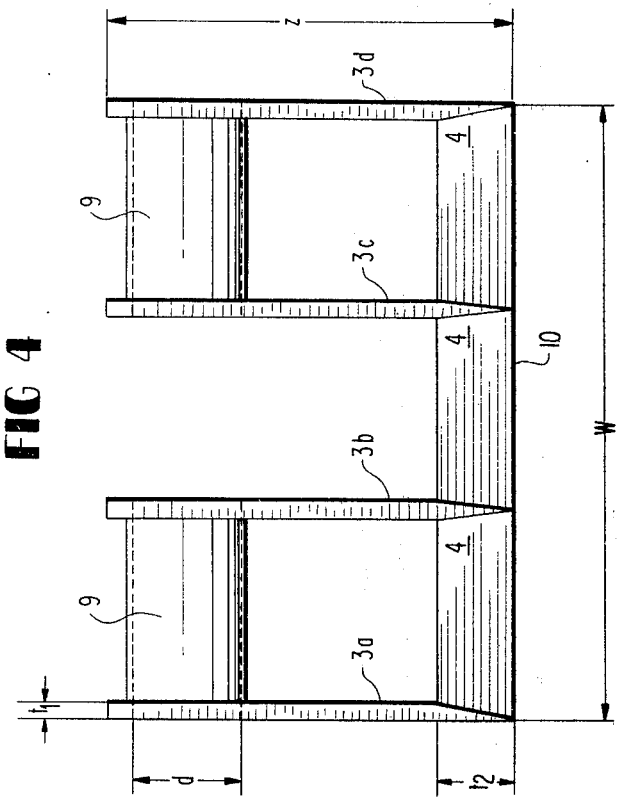
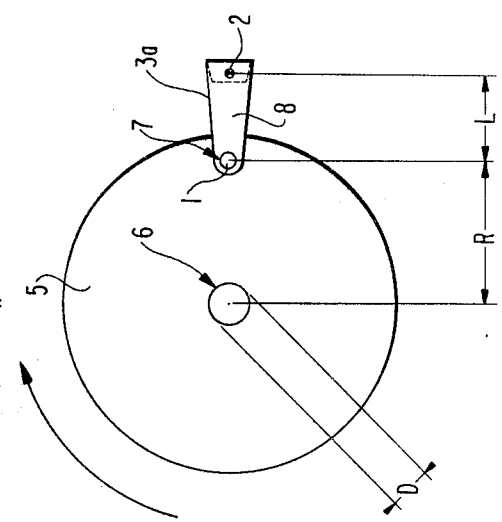
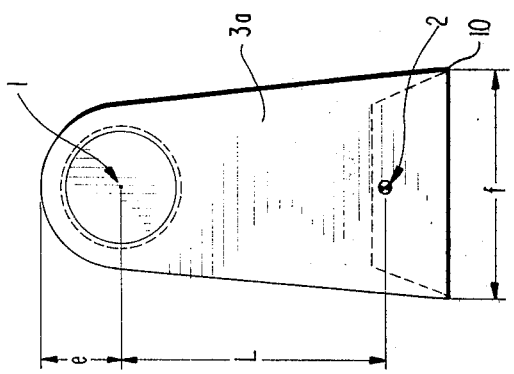
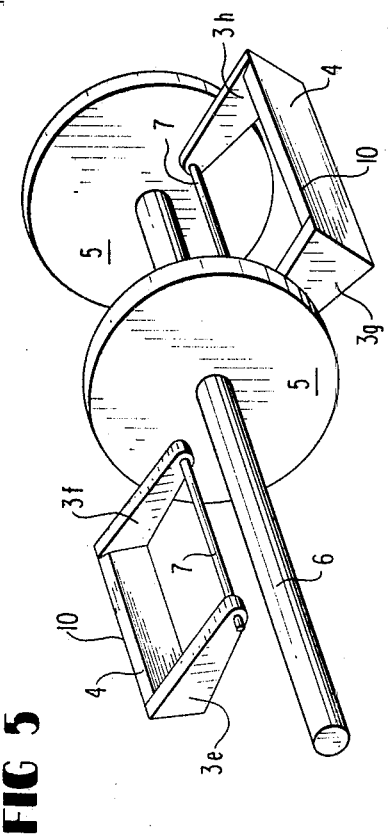

SYNCHRONIZED FLAIL FOR TREATMENT OF FORESTRY RESIDUES

CROSS-REFERENCE TO RELATED APPLICATION

This is a continuation-in-part application of Ser. No. 860,275, filed Dec. 13, 1977 now abandoned.

BACKGROUND OF THE INVENTION

Relating to silviculture and forest fire management, this invention pertains to devices for cutting tree thinning residues and logging slash into a plurality of small pieces. More specifically these devices include vehicles for moving across the forest floor with rotating cutting means having free-swinging flail type blades.

DESCRIPTION OF THE PRIOR ART

"Slash" or "forest residues" is generally defined as the unused portions of trees and the like left on the forest floor by logging operations, construction of roads through the forest, and the thinning of young timber. It includes tree tops, limbs, cull logs, stumps and root wads. Accumulation of slash creates fire hazards, breeds bugs, and adversely affects wildlife, water-sheds, and aesthetics. Treatment includes crushing, cutting, chopping, chipping and splitting the slash in order to lower its center of gravity with respect to its elevation above the ground.

Slash treatment equipment with rotating cutting means have utilized free-swinging flails of four general design categories:

1. A flail fabricated from uniform thickness flat stock, resembling generally a rectangular, metal plate exemplified by the Railway Maintenance Corp (RMC) "Brush Cutter" (Michael "B" Lambert, American Society of Agricultural Engineers, Paper No. 74-1570).

2. A cast, single thickness hammer flail such as the Nicolas DT-213 described in "Field Equipment for Precommercial Thinning and Slash Treatment" by McKenzie and Miller, Forest Service, USDA, July 1978, p. 27. This type of flail is designed to be very light at the cutting edge so as to lessen the damage and the vibrational shocks that occur when the flail strikes a resistant object.

3. A stirrup-type flail, made of flat stock formed into a "U"-shape. This type of flail, exemplified by U.S. Pat. No. 3,574,989, is also designed to lessen the "shock effect of a cut resistant obstacle". After striking the obstacle, the flail is "repelled to the shelter of stroke limiters." Centrifugal force then causes the flails to gradually emerge as the rotor continues to turn.

4. A light-duty, "L" shaped, bent strip stock flail generally used for mowing, U.S. Pat. No. 2,990,667 and U.S. Pat. No. 2,711,067.

Slash treatment machines incorporating these flail designs have typically suffered from problems of excessive machine breakdown and high safety risks due to broken flails and flying debris.

The prior art flails depend on relatively sharp edges to separate wood fibers by cutting, chipping, tearing or shredding actions.

All of these actions require tool/wood contact for every wood chip that is produced. Typically, wood cutting is done with many sharp teeth at high cutting speeds. The result is usually small chips or even sawdust.

For slash treatment work in forestry, there is no need to produce fine particles of wood such as chips or sawdust. These fine particles can even be damaging to silcicultural activities, when left on the forest floor in quantity. Maintaining cutting edges in sharp condition is difficult and expensive in slash treatment operations because of the dirt and rocks always encountered. Existing machines used for slash treatment hold cutting tools above the ground so as to avoid ground contact. This leaves much of the forest residue, especially stumps and stobs, uncut.

There is also an energy penalty for making the wood particles too small. Every pass of a sharp cutting edge through wood creates a new surface, and every pass absorbs energy.

Slash treatment machines are needed that can cut wood into larger chunks. Larger chunks will decompose over longer periods, aiding rather than slowing silviculture processes. Larger chunks mean fewer cut surfaces and, therefore, lower energy requirements.

SUMMARY OF THE INVENTION

We have discovered synchronized flail designs which obviate the prior art problems. In machines for treatment of tree thinning residues and logging slash of the type having free-swinging flails pivotably connected to rotatable support structures at a pivot point, the improvement wherein each flail comprises a cutting blade containing the effective center of mass of the flail, and a plurality of side arms connected at one end to the cutting blade and having at the other end means for pivotal connection to the rotatable support structure, the means for pivotal connection being located on the rotatable support structure and the length of the side arms being such that the distance R from the axis of rotation of the rotatable support structure to the pivot point, and the distance L from the pivot point to the flails effective center of mass have the following relationship:

$$\sqrt{R/L} = n/2$$

where n is any integer from 1 to 5.

When compared to prior art machines, machines employing synchronized flails having the following advantages:

1. Vibration, component failure, and blade damage are greatly reduced.

2. Synchronized flails impact on each rotation and exert more energy into each impact, and are therefore more energy efficient than non-synchronized flails, i.e., a given slash treatment job can be done with much lower horsepower-hour per ton of slash treated.

3. It is not necessary for synchronized flails to have sharp edged blades. In fact dull edged blades are much preferred.

4. It is possible to operate synchronized flails in abrasive dirt and rocks without damage to the flails or the machine. Stumps can be removed below ground level.

BRIEF DESCRIPTION OF THE DRAWINGS

FIG. 3 is an end view of the synchronized flail shown in FIG. 2.

FIG. 4 is a front view of the synchronized flail shown in FIG. 2.

FIG. 5 is a perspective view of a partial flail assembly including a shaft two synchronized flails and two rotatable support structures.

FIG. 6 is a schematic end view of a partial flail assembly showing one suitable support structure and one flail.

DESCRIPTION OF THE PREFERRED EMBODIMENTS

Figure 1:
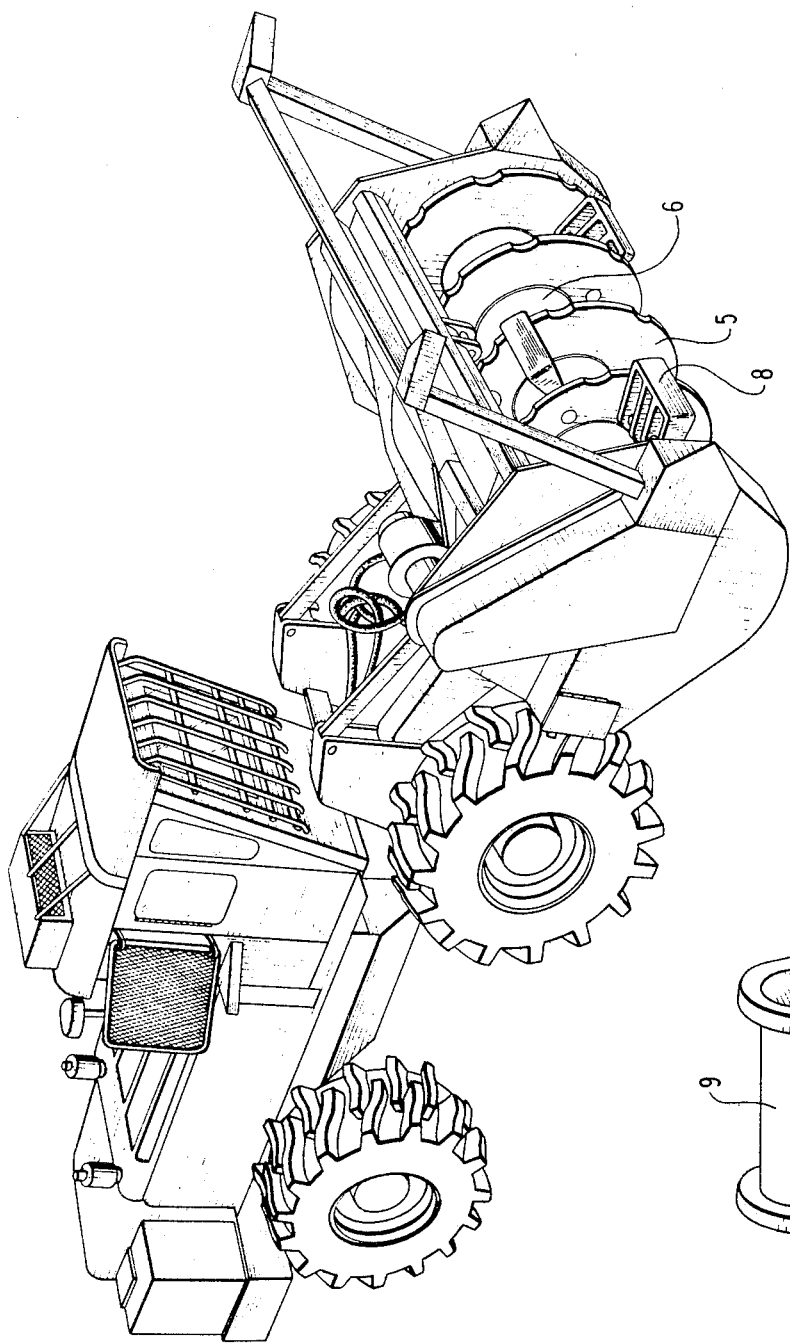
FIG. 1 is a perspective view of a Forestry residue and slash cutting machine having a rotating flail assembly with synchronized flails.

In order to understand the dynamic actions of prior art machinery, the inventors operated and observed actual slash cutting devices under controlled conditions in an instrumented facility built especially for this purpose. Flails of all four general design categories described above were tested in the facility. High speed photography allowed careful scrutiny of flail motions during and between impacts on various sized logs and for the first time the problems of the prior art flails became evident. The high speed films showed that flails from the first category often struck the logs at peculiar angles relative to the rotating support structure. These flails did, however, possess enough energy to effectively cut through or fracture the logs up to 6 inches diameter. Flails from the other three categories, above, were observed to actually oscillate backwards relative to their support structures following impacts on solid wood. Because of this backwards oscillation, the flails typically could not impart any cutting energy into the logs for 8 to 10 successive revolutions of the support structure. By the time these flails regained their proper extended cutting positions, non-cutting portions of the support structures were often rubbing on the logs, causing frictional energy losses and smoke or fires. Subsequent impacts sent the flails oscillating in reverse again, because they had insufficient energy to cut or fracture the wood now rubbing against the structure.

After observing these flail actions, the inventors attempted to design a new flail that combined the higher energy levels of the heavy, flat stock type flail with some of the desirable features of the stirrup type flail. The result was promising in that there was now sufficient energy to always cut through the logs. Unfortunately, the new flail sometimes had a tendency to "hook" the logs and throw them around. This was undesirable from a safety viewpoint.

The inventors then added various structural components to that flail to discourage "hooking" and to improve the energy transfer from flail to log. Dulling the striking edges of the flail also helped in both areas. This flail (Flail A) contained sufficient energy and means to deliver the energy into the logs, but it was not synchronized and, therefore, was not in accordance with the invention. The films showed a potentially hazardous movement of the flail, similar to that observed with the prior art flails. The flail sometimes contacted the log in an undesirable attitude. That is, the flail, being deflected from a radially extended position by a previous impact, sometimes was lagging or leading the normal, radially extended position as it restruck the log. In either of these cases, the edge designed for impact could not contact the log, and tremendous forces were transmitted directly through the flail to its support structure. These forces were measured by strain gages mounted on the support structure. When the flail was in a leading position, the forces were extremely violent. Using high speed film, the inventors observed flail A and other prior art flails actually squashing logs with the flat end of the flails.

At this point, the inventors were able to describe the limiting factor in previous flail designs. Previous designers have supposed that since flails evidently are subject to being in random positions as they impact their targets, it must be necessary to protect against over stressing the machinery. Most designers built lightweight flails that oscillate backwards, thus limiting the transmitted forces. Other designers built heavier flails that carried higher energy levels to increase effectiveness, but these flails have to be limited to input power or size of workload or else occasional structural failures of the flails, their support pins, drive shafts, or some other machine components will occur.

The inventors then reasoned that if a flail was to have both high energy and high reliability (low incidence of failure) then it would be necessary to control the oscillations of the flail so that each time it makes an impact it would be in the proper position to deliver its energy into the logs instead of back through the support structure. Heavy, high energy flails did not have the problem of rotating backwards after impact, but even very heavy flails can strike in the wrong position with disastrous results. Therefore, the inventors devised the synchronization concepts of this invention so that high energy, efficient blades could be combined with consistent, proper impact positioning to increase machine effectiveness, efficiency and safety.

Flail synchronization, or controlled timing of deflected recovery, was achieved by designing the relative dimensions of the flails and their supporting structure such that the natural frequency of the flails swinging has the correct ratio to the rotating frequency of the supporting structure that will permit the blades to return to their proper positions during the time available between subsequent impacts. This insures that the blade of the flail will always enter the workpiece at the same correct angle, each time it comes around. The mathematical models used to determine the natural frequency are fully described by the applicant in Paper No. 76-1573 of the American Society of Agricultural Engineers, P.O. Box 229, St. Joseph, Mich. 49085; which is hereby incorporated by reference. It is shown therein that the flails natural frequency ($f_B$) is a function of the rotating frequency of the supporting structure ($f_s$) as follows:

$$\frac{(f_B)}{(f_s)} = \frac{\text{Period of structure } (P_s)}{\text{Period of flails } (P_B)} = \sqrt{\frac{\text{Radius of the Rotatable Support } (R)}{\text{Effective flail length } (L)}}$$

This relationship is shown schematically in FIG. 6, where R is the distance between the axis of rotation of rotatable support 5 (i.e., center of rotation of main shaft 6) and pivot point 1 (i.e., center of rotation of pivot pin 7) and where L is the length of flail 8 measured from pivot point 1 to the flails effective center of mass 2 located in blade 4. The ratio $f_B/f_s$ equal n/2 where n is any integer from 1 to 5. Ratio R/L then becomes 0.25, 1, 2.25, 4, and 6.25. For cutting on the flails forward oscillation (which imparts more energy than cutting on a backward oscillation) n is preferably any odd integer from 1 to 5. Preferably integers 1 to 3, and most preferably 1, are used to reduce the effects of unpredicted damping or large oscillation. A certain amount of damping can be added to ensure that the flails do not oscillate on a frequency other than the natural frequency, which may be a harmonic of the structure's frequency. The actual ratio of R/L may be varied some what and still cause flail synchronization.

FIG. 1 shows a forestry residue and slash cutting machine having a rotary flail assembly with synchronized flails. Main shaft 6 is rotatably mounted on and driven by the forestry residue and slash cutting machine in a conventional manner. Rotatable supports 5 are fixed to and rotate with main shaft 6. Synchronized flails 8 are pivotally attached to rotatable supports 5 by pivot pins 7. FIG. 1 shows each flail 8 to be located between two rotatable supports 5, however, a flail could straddle a single rotatable support and still be within the scope of the invention.

Figure 2:
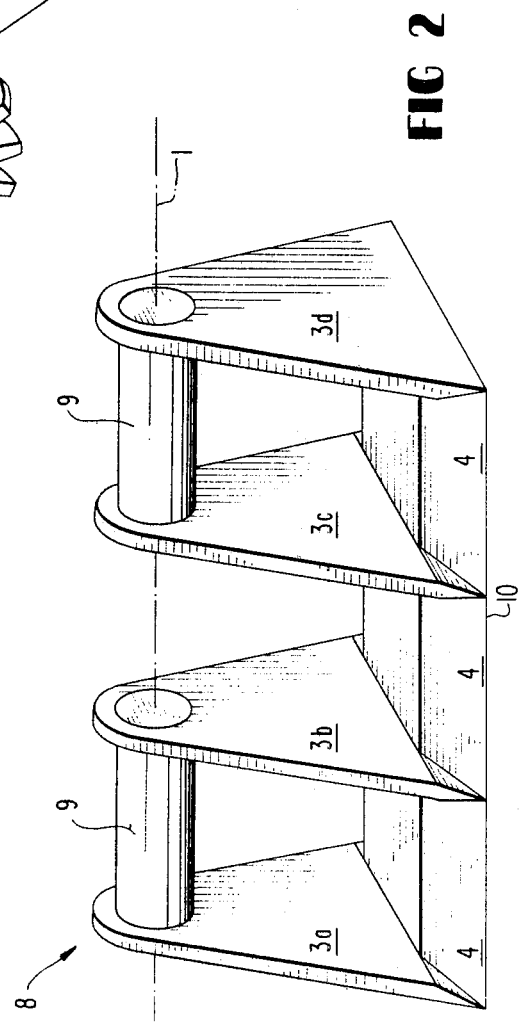
FIG. 2 is a perspective view of a synchronized flail.

A preferred embodiment of a single flail is shown as a perspective view in FIG. 2, as an end view in FIG. 3, and as a front view in FIG. 4. A second embodiment is shown in FIG. 5. One rotatable support is not shown in FIG. 5 in order that the flail can be seen. The flail is a modified version of the U-shaped stirrup flail. It consists of flat bar-shaped blade 4 having at least two vertical side arms 3 (see side arms 3e and 3f FIG. 5) attached at their lower ends to the ends of blade 4. For greater structural strength a plurality of side arms 3 can be attached to blade 4 in a manner such that blade 4 will be divided into several equal sections (see side arms 3a, 3b, 3c, and 3d, FIGS. 2 and 4). Located at the upper end of side arms 3 are bushings 9 in which pivot pins 7 (FIGS. 1 and 6) rotate. Bushings 9 can be simply holes in side arms 3 or, preferably they are cylindrical bushings linking side arms 3a to 3b and 3c to 3d as shown in FIGS. 2 and 4. Side arms 3 are perpendicular to blade 4 and bushings 9 are parallel to edges 10 of blade 4.

It is preferred that blade edges 10 be dull or blunt. The inventors discovered that heavy flails with relatively dull impact edges cause wood to fail along preferred fracture planes. That is, a high energy impact at one position on a piece of wood can send shock waves through the wood that cause the wood to crack where it is weakest. Propagation of these cracks has been recorded on high speed motion pictures during controlled tests. This fail mechanism of wood (unknown to prior art) permitted the inventors to use dull edged flails in their design. Wood fracturing along weak planes ahead of the flail impact yields random-sized chunks and requires fewer passes of the flails through the wood; hence, lower overall energy consumption to treat slash. This breakage method means that a given slash treatment job can be done with much lower horsepower-hour per tone requirements than possible using prior art flails.

Dull edged flails permit extended operation of the slash treatment machinery in dirt and rocks. Now, with dull edged flails, stumps may be taken out even below ground level, without damage to the flails or the machines.

The following examples are intended to show the criticality of the R/L values:

Flail A (see above) dimensions (FIGS. 3 and 4) are as follows:

| | |
|---|---|
| $Z = 7\frac{1}{2}$ | $e = 1\frac{3}{4}$ |
| $R = 18$ | $t_1 = 1$ |
| $D = 6$ | $t_2 = 1$ |
| $L = 4.06$ | $f = 6$ |
| $d = 1\frac{1}{4}$ | $w = 20$ | and, $R/L = 18/4.06 = 4.43$

This ratio does not result in synchronized flails because the square root of 4.43 is 2.1, which is not any multiple of $\frac{1}{2}$. Analysis of that flail showed that added weight without synchronization is not sufficient to produce an acceptable flail design for heavy slash cutters. Synchronization is very important to machinery with heavy flails, and synchronization cannot be achieved unless the R/L ratio is precisely correct.

Flail B is synchronized and performed in accordance with the invention and produced wood residues ranging in size from chunks about the size of a man's fist to about arm size:

| | |
|---|---|
| $Z = 11.5$ in. | $e = \frac{3}{4}$ in. |
| $R = 18$ in. | $t_1 = \frac{3}{4}$ in. |
| $L = 8.0$ in | $t_2 = 2\frac{1}{4}$ in. |
| $d = 2\frac{1}{8}$ in. | $f = 6$ in. | and, $R/L = 18/8 = 2.25$

It should be clearly understood that configurations and dimensions of flails other than those specifically described above will be in accordance with the invention as long as proper R/L values are incorporated into the design. Also, those skilled in the art will find uses for synchronized flails other than for treatment of forestry residues. The principle would apply to any machine that uses free-swinging flails to crush, chip, cut, chop or split.

Having thus described our invention, we claim:

1. In a machine for treatment of tree thinning residues and logging slash of the type having free-swinging flails pivotably connected to rotatable support structures at a pivot point, the improvement wherein said flail comprises a cutting blade containing the effective center of mass of said flail, and a plurality of side arms connected at one end to said cutting blade and having at the other end means for pivotal connection to said rotatable support structure, said means for pivotal connection being located on said rotatable support structure and the length of said side arms being such that the distance R from the axis of rotation of said rotatable support structure to said pivot point, and the distance L from said pivot point to said flails effective center of mass have the following relationship:

$$\sqrt{R/L} = n/2$$

where n is any integer odd from 1 to 5.

* * * * *